TELEVISION RECEIVER ADJUSTING SYSTEM

Filed April 18, 1951

INVENTOR
Leopold M. Kay
BY Clyde A. Norton
ATTORNEY

Patented Oct. 27, 1953 2,657,263

UNITED STATES PATENT OFFICE 2,657,263

TELEVISION RECEIVER ADJUSTING SYSTEM

Leopold M. Kay, New York, N. Y., assignor to CBS-Columbia Inc., a corporation of New York Application April 18, 1951, Serial No. 221,673

5 Claims. (Cl. 178—69.5)

Figures 1, 2:
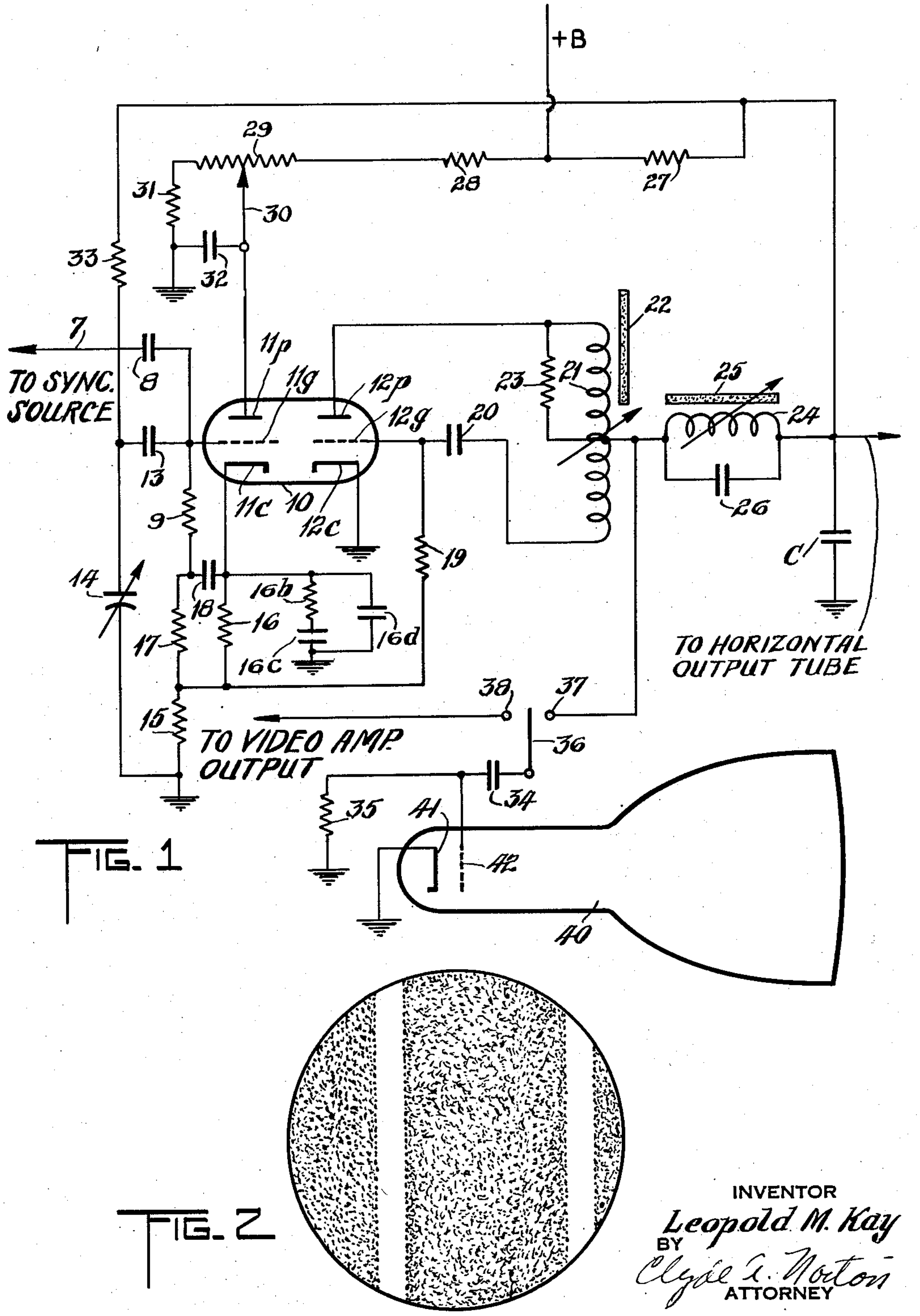

This invention relates to improvements in television receivers, and more particularly to a method and apparatus for simplifying the adjustment of the receiver, and particularly, the horizontal synchronizing circuits, and reducing the time, labor and expense of making such adjustments.

Many television receivers are provided with what is commonly known as a synchro-guide automatic frequency control circuit. Briefly, it may be stated that this comprises a pair of tubes which receive the horizontal synchronizing pulses and deliver the saw tooth horizontal sweep voltage, in step therewith, to the horizontal deflection circuits of the cathode ray tube.

It is known, however, that as the circuit goes out of adjustment for any of a number of reasons, the receiver no longer synchronizes properly, and the picture deteriorates. When this condition occurs, it is necessary for the average user to call in a service man. To restore the circuit to proper adjustment, it has heretofore been necessary to remove the chassis from the cabinet, and make the correcting adjustments with the aid of an oscilloscope connected to a selected point in the circuit.

The average user, of course, has neither the knowledge nor the equipment to perform such operations.

It is an object of this invention to provide a television receiver which is so constructed and arranged that such correcting adjustments may be made easily, simply, and quickly, without removing the chassis from the cabinet.

It is a further object of this invention to provide means for utilizing the cathode ray tube, always present in a television receiver, as the oscilloscope necessary for making the adjustment, and to provide for the establishment of the circuit connections to the proper point by the operation of a manual switch, so the user does not need to disturb the permanent connections in the chassis, and, in fact, does not even need to open the back of the cabinet.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a circuit diagram of so much of a television receiver according to my invention as is necessary to an understanding thereof, and Fig. 2 is a view of the face of the cathode ray tube showing one pattern used in making an adjustment.

Referring now more particularly to the drawing, 10 represents the synchro-guide tube, which may be a pair of triodes within a single envelope, having a first cathode 11c, a first grid 11g, a first plate 11p, a second cathode 12c, a second grid 12g, and a second plate 12p. The incoming horizontal synchronizing signals, after separation from the incoming carrier, in any known and suitable manner, are impressed through lead 7, and series condenser 8, upon grid 11g, which is connected to cathode 11c through resistor 9 and condenser 18.

Grid 11g is connected to cathode 11c through another path comprising condenser 13, variable condenser 14, resistors 15 and 17 in series, and condenser 18. Resistor 16 shunts resistor 17 and condenser 18. Cathode 11c is connected to ground through resistor 16b and condenser 16c, both shunted by condenser 16d. Plate 11p is bypassed through condenser 32 to ground, and connected by potentiometer blade 30 to a variable point on resistor 29, in series with resistors 28 and 31 from plus B to ground.

Cathode 12c is connected to ground, grid 12g through resistor 19 to the common point of resistors 16 and 17 and plate 12p through frequency coil 21 and condenser 20 to grid 12g. A portion of coil 21 is shunted by resistor 23, and the coil is tuned by permeability core 22, which is movable into and out of the coil by a screw adjustment, preferably accessible on the back of the chassis. An intermediate point of coil 21 is connected to one terminal of phase coil 24, shunted by condenser 26, and coil 24 is likewise tuned by permeability core 25, movable into and out of the coil, by a similar screw adjustment on the back of the chassis.

The other terminal of phase coil 24 is connected to plus B through resistor 27, to the common terminal of condensers 13 and 14 through resistor 33, to one terminal of charging condenser C, the other terminal of which is grounded, and to the grid of the horizontal sweep output tube (not shown). The horizontal sweep voltage is supplied to the usual deflection circuits of cathode ray tube 40 in any usual way, and since this is well known in the art, the deflecting circuits are omitted for simplicity. The grid 42 of the cathode ray tube is connected to ground through resistor 35, and in conventional receivers, to the output of the video amplifier (not shown). According to my invention, the grid 42 is connected through condenser 34 to the blade 36 of a switch, movable to contact 37 or 38 selectively. Contact 37 is connected to the common point of coils 21 and 24.

Contact 38 is connected to the output of the video amplifier, so it will be seen that operation of the switch connects the grid of the cathode ray tube selectively to the common point of coils 21 and 24, or to the output of the video amplifier. The cathode 41 of tube 40 is connected to ground.

The electron gun, ion trap, focusing magnets, etc., are omitted for simplicity, but it will be understood that they are employed in the conventional and well known manner.

To adjust the circuit, a signal is first tuned in with switch arm 36 on contact 38, and the picture is examined. The frequency coil is then adjusted by operating the screw to move core 22. This adjustment is made approximately, and the best position is determined by looking at the picture. The switch blade is then moved to contact 37, and the picture will then disappear and be replaced by a pattern generally similar to that of Fig. 2, having two bright vertical bands 50 unsymmetrically placed on the face of the tube. These bands are of unequal brightness, when the synchro-guide circuit is out of adjustment, and of equal brightness when the circuit is properly adjusted.

The final part of the adjustment is made by turning the brightness control of the receiver down until the dimmer of the two bands just disappears, and by adjusting the two cores 22 and 25 until the two bands are of equal brightness. The circuit is then in proper adjustment, and switch blade may then be returned to contact 38, which will restore the connection of grid 42 to the output of the video amplifier, the band pattern will disappear, and the picture will reappear.

While in the foregoing I have shown and described the use of the cathode ray tube, or so-called picture tube as an oscilloscope in making the adjustment of the synchro-guide circuit, it will be understood that the same principles may be applied to making other adjustment to the receiver, by providing switches for disconnecting the grid of the picture tube from the output of the video amplifier and connecting it to other points in the circuit to provide test voltages, the pattern of which may be examined on the screen of the picture tube operating as an oscilloscope.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In a television receiver having a video amplifier and a cathode ray tube with a grid, connections from the output of said amplifier to the grid of said tube means for producing a non-picture voltage the value and shape or form of which is an indication of the condition of adjustment in said receiver, connections from a circuit point in said non-picture voltage producing means to said grid, and a switch for selectively opening either of said connections and closing the other, whereby said tube may be selectively used either as a picture tube or as an oscilloscope in testing the condition of said receiver.

2. In a television receiver having a cathode ray tube with a grid, a video amplifier, and a synchro-guide circuit having connected frequency and phase coils providing means for producing a non-picture voltage the value and form or shape of which is an indication of the condition of adjustment in said receiver, a switch connected to said grid, and connections from said switch to the output of said amplifier and to said frequency and phase coils, whereby said grid may be selectively connected to the output of said amplifier to produce a picture, or to said coils to produce an oscilloscope pattern of the non-picture voltage.

3. In a television receiver having a cathode ray tube with a grid, a video amplifier means for producing a non-picture voltage the value and shape or form of which is an indication of the condition of adjustment in said receiver, a double-throw switch having its blade connected to the grid of said tube, one of its contacts connected to the output of said video amplifier, and the other of its contacts connected to said non-picture voltage producing means, whereby said tube may be selectively used as a picture tube or as an oscilloscope in testing said receiver.

4. In a television receiver having a cathode ray tube with a grid, a video amplifier, and a synchro-guide circuit having connected frequency and phase coils providing means for producing a non-picture voltage the value and shape or form of which is an indication of the condition of adjustment in said receiver, a double throw switch having a blade and a pair of contacts selectively engaged by said blade, said switch having its blade connected to said grid, one contact connected to the output of said amplifier, and the other contact connected to said frequency and phase coils, whereby said tube may be selectively used as a picture tube or as an oscilloscope in testing said receiver.

5. In a television receiver having a video amplifier and a cathode-ray tube with a grid, a selecting switch providing a connection to the grid of said cathode-ray tube, means for producing a non-picture voltage the value and shape or form of which is an indication of the condition of adjustment in said receiver, connections from said switch to the output of said video amplifier, connections from said switch to said non-picture voltage producing means, whereby operation of said switch permits use selectively of said cathode-ray tube either as a picture tube in association with the output of said video amplifier, or as an oscilloscope to display the pattern of said non-picture voltage.

LEOPOLD M. KAY.

References Cited in the file of this patent

UNITED STATES PATENTS

| Number | Name | Date |
|---|---|---|
| 2,315,377 | Poch | Mar. 30, 1943 |
| 2,515,613 | Schoenfeld | July 18, 1950 |